US008596403B2

(12) United States Patent
Cunningham et al.

(10) Patent No.: US 8,596,403 B2
(45) Date of Patent: Dec. 3, 2013

(54) MOTOR MOUNTING ASSEMBLIES FOR ELECTRIC VEHICLES AND ELECTRIC VEHICLES COMPRISING THE SAME

(75) Inventors: James Dennis Cunningham, Novi, MI (US); Taichi Yamashita, Northville, MI (US); Alan Williams, West Bloomfield, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 13/426,716

(22) Filed: Mar. 22, 2012

(65) Prior Publication Data

US 2013/0248275 A1 Sep. 26, 2013

(51) Int. Cl.
*B60K 1/00* (2006.01)

(52) U.S. Cl.
USPC .......................................... 180/300; 180/291

(58) Field of Classification Search
USPC ............. 180/291, 298, 299, 300; 296/203.01, 296/204, 205, 203.02, 203.04
See application file for complete search history.

(56) References Cited

U.S. PATENT DOCUMENTS

| 4,467,992 | A  | * | 8/1984  | Morimura et al. ............ 248/659 |
| 5,213,179 | A  |   | 5/1993  | Goor |
| 5,335,745 | A  |   | 8/1994  | Goor |
| 6,217,297 | B1 |   | 4/2001  | Tsumagari et al. |
| 7,588,117 | B2 | * | 9/2009  | Fukuda ......................... 180/291 |
| 7,766,113 | B2 |   | 8/2010  | Yamafuji |
| 7,850,228 | B2 | * | 12/2010 | Asai ......................... 296/203.02 |
| 7,874,395 | B2 | * | 1/2011  | Taji et al. ...................... 180/300 |
| 2004/0031638 | A1 | * | 2/2004 | Kramer et al. ................ 180/291 |
| 2006/0096794 | A1 |   | 5/2006 | Yoshida |
| 2006/0284449 | A1 | * | 12/2006 | Miyahara ..................... 296/204 |
| 2008/0078603 | A1 |   | 4/2008 | Taji et al. |
| 2009/0251843 | A1 |   | 10/2009 | Hironaka |
| 2011/0062677 | A1 |   | 3/2011 | Kudla et al. |
| 2011/0162899 | A1 |   | 7/2011 | Blade |
| 2012/0292124 | A1 |   | 11/2012 | Yamashita et al. |

* cited by examiner

*Primary Examiner* — John Walters
(74) *Attorney, Agent, or Firm* — Dinsmore & Shohl LLP (57) ABSTRACT

An electric vehicle includes a right side member and a left side member with a motor compartment disposed therebetween, a motor compartment cross member extending transversely across the motor compartment, the motor compartment cross member coupled to the left side member and the right side member, a front cross member extending transversely across the motor compartment, wherein the front cross member is spaced apart from the motor compartment cross member in a vertical direction, and a motor mount member extending between the front cross member and the motor compartment cross member, wherein the motor mount member is coupled to the front cross member and the motor compartment cross member, the motor mount member comprising an attachment point for receiving a corresponding coupler of an electric motor.

18 Claims, 6 Drawing Sheets

MOTOR MOUNTING ASSEMBLIES FOR ELECTRIC VEHICLES AND ELECTRIC VEHICLES COMPRISING THE SAME

TECHNICAL FIELD

The present specification generally relates to mounting structures for use in a motor compartment of a vehicle and, more specifically, to mounting structures for securing an electric motor within a vehicle.

BACKGROUND

Electric motors, like conventional engines, are secured by a motor mount to a vehicle frame, allowing the electric motor to apply torque to the drive train components. The motor mount reacts the motive torque applied to the drive train components, and prevents the electric motor from moving within the motor compartment. Known designs include attaching the electric motor to a single cross-member spanning the width of the motor compartment as is done with combustion engines. However, electric motors distribute forces in a manner different from combustion engines.

Accordingly, a need exists for alternative mounting structure for securing an electric motor within a vehicle.

SUMMARY

In one embodiment, an electric vehicle may include a right side member and a left side member with a motor compartment disposed therebetween. A motor compartment cross member may extend transversely across the motor compartment. The motor compartment cross member may be coupled to the left side member and the right side member. A front cross member may extend transversely across the motor compartment. The front cross member may be coupled to the left side member and the right side member and spaced apart from the motor compartment cross member in a vertical direction. A motor mount member may extend between the front cross member and the motor compartment cross member in a forward-aft direction of the electric vehicle. The motor mount member may be coupled to the front cross member and the motor compartment cross member and may include an attachment point for receiving a corresponding coupler of an electric motor.

In another embodiment, an electric vehicle drive train sub-assembly may include an electric motor, a front cross member, and a motor mount member. The front cross member generally extends between a first end and a second end of the front cross member and is oriented such that a long axis of the front cross member is substantially parallel with an axis of rotation of the electric motor. The motor mount member may include a hanger coupled to a top plate and a bottom plate. The bottom plate may be coupled to the front cross member. The hanger includes an attachment point and the motor is coupled to the attachment point.

In another embodiment, a method of assembling an electric vehicle drive train sub-assembly into a vehicle sub-assembly may include positioning an electric motor drive train subassembly below a vehicle body. The electric motor drive train subassembly may include an electric motor, a front cross member and a motor mount member. The front cross member extends between a first end and a second end of the front cross member and may be oriented such that a long axis of the front cross member is substantially parallel with an axis of rotation of the electric motor. The motor mount member may include a hanger coupled to a top plate and a bottom plate. The bottom plate may be coupled to the front cross member. The hanger may include an attachment point and the motor may be coupled to the attachment point. The electric motor drive train subassembly may be mated with a motor opening of the vehicle body and the front cross member may be secured to a left side member and a right side member of the vehicle body such that the front cross member extends transversely across the motor opening of the vehicle body. Thereafter, the motor mount member may be secured to a motor compartment cross member extending transversely across the motor opening of the vehicle body.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1A:
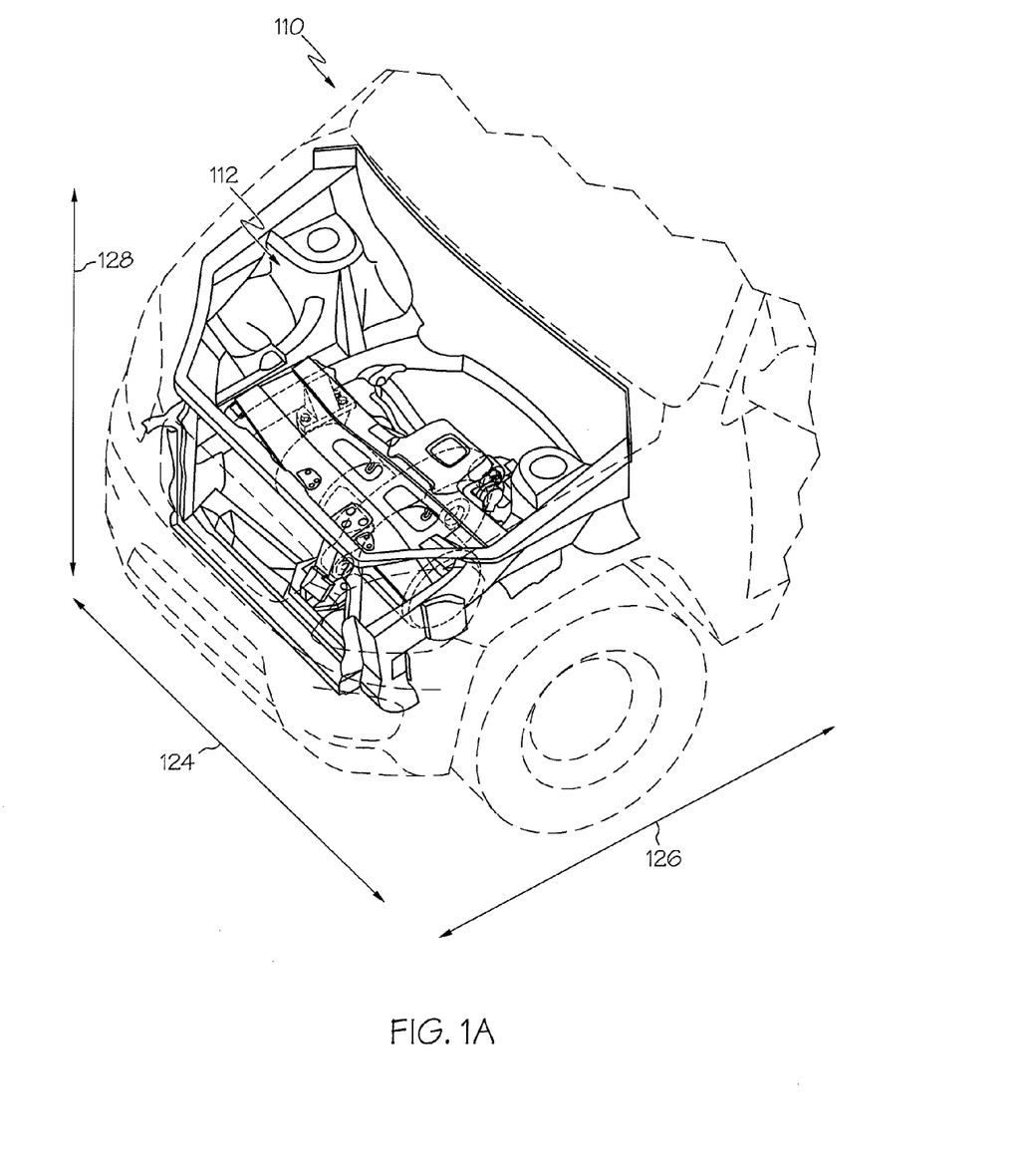
FIG. 1A schematically depicts a portion of an electric vehicle which includes a motor mounting assembly in accordance with one or more embodiments of the present invention.

FIG. 1A generally depicts an electric vehicle having an electric motor positioned in a motor compartment of the vehicle and secured with a motor mounting assembly. The motor mounting assembly generally includes a front cross member, a motor compartment cross member and a motor mount member. The front cross member extends transversely across the motor compartment and is coupled to the left and right side members of the electric vehicle. A motor compartment cross member extends transversely across the motor compartment and is coupled to the left and right side members of the electric vehicle. The motor compartment cross member is offset from the front cross member in a vertical direction. The motor mount member extends between the front cross member and the motor compartment cross member in a forward-aft direction of the electric vehicle and is coupled to the front cross member and the motor compartment cross member. Various embodiments of electric vehicles and motor mounting assemblies for electric vehicles will be described in more detail herein with specific reference to the appended drawings.

Electric motors, like gasoline combustion engines, generate motive forces to the drive train subassembly of the vehicle. However, electric motors generate and distribute those forces in a manner distinct from gasoline combustion engines. One such distinction is that electric motors produce greater torque at the armature of the motor. Further, the configuration of the electric motor and related components, such as the transmission and the like, may not be symmetrical with respect to the axes of the motor and, as such, the loads imparted by the motor to the surrounding motor compartment structure may not be equally distributed. Motor mount members designed to support gasoline combustion engines may not be configured to carry and distribute the increased torque of an electric motor as well as the unbalanced load of the electric motor. The motor mounting assemblies described herein overcome these efficiencies, particularly when the motor mounting assemblies are used to retrofit vehicles designed for conventional combustion engines with an electric motor drive train.

Figure 1B:
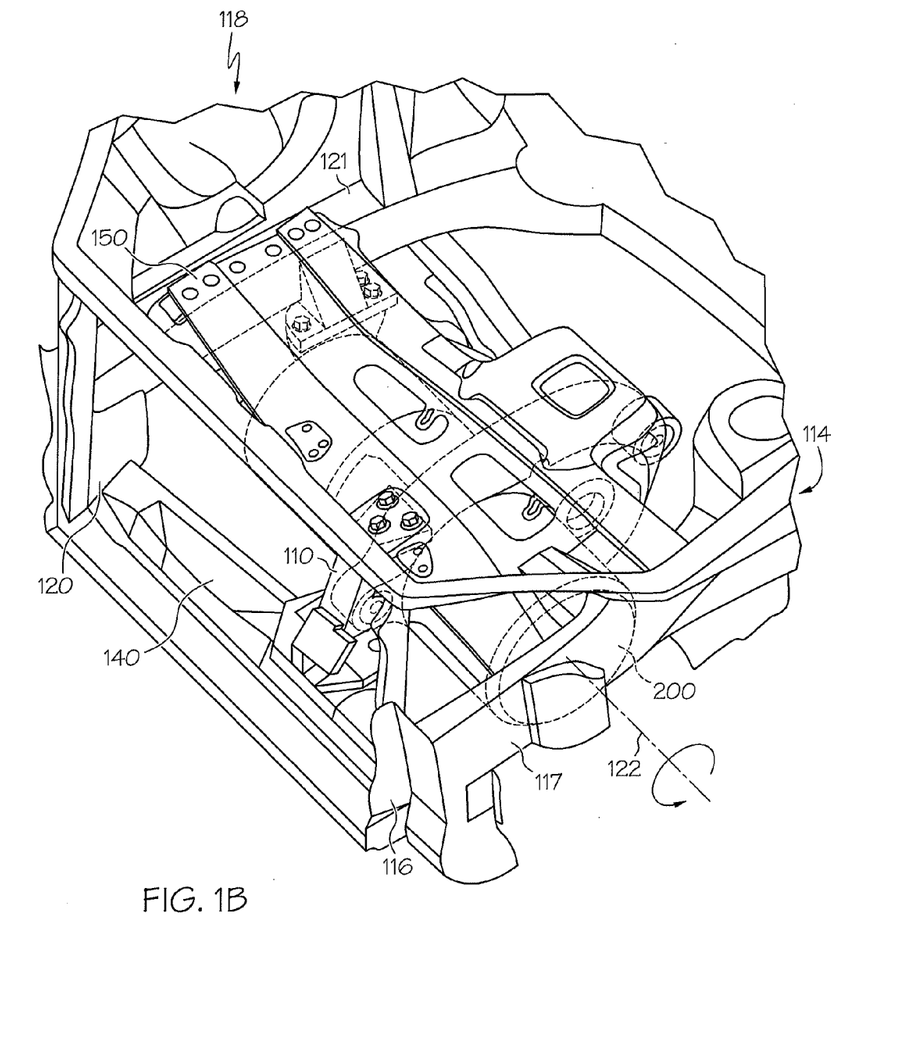
FIG. 1B schematically depicts a portion of the motor compartment of the electric vehicle of FIG. 1A.

Referring now to FIGS. 1A and 1B, a front portion of an electric vehicle 110 is schematically depicted. The electric vehicle 110 generally includes a front left side member 114 and a front right side member 118 with a motor compartment 112 positioned between the front left side member 114 and the front right side member 118. A motor mounting assembly 130 is coupled to the front left side member 114 and the front right side member 118. An electric motor 200 is coupled to the motor mounting assembly 130 such that an axis of rotation 122 of the electric motor 200 is generally parallel to a transverse direction 124 of the electric vehicle 110.

In the embodiments described herein, the motor compartment 112 is positioned in a front portion of the vehicle 110 and is generally defined by the front left side member 114 and the front right side member 118. In the embodiments described herein, the front left side member includes a lower left side member 116 and an upper left side member 117 while the front right side member 118 includes a lower right side member 120 and an upper right side member 121. The lower and upper left side members 116,117 and the lower and upper right side members 120,121 generally have a longitudinal orientation with respect to the vehicle 110 (i.e., the side members are generally parallel to a forward-aft direction 126 of the vehicle). In the embodiments described herein, the front left side member 114 and the front right side member 118 are secured to the front bumper beam (not shown) of the electric vehicle 110 at the front of the vehicle and are secured to the underbody structure of the vehicle aft of the motor compartment 112.

The motor mounting assembly 130 is positioned within the motor compartment 112 and includes a transversely-oriented front cross member 140, a transversely-oriented motor compartment cross member 150, and a motor mount member 160 disposed between the front cross member 140 and the motor compartment cross member 150. As used herein, the phrase "transversely oriented" means that the component is generally positioned in the transverse direction 124 of the electric vehicle 110 (as opposed to the forward-aft direction 126 of the electric vehicle 110). The motor compartment 112 further includes one or more auxiliary motor mounts 166, 168 (FIGS. 2 and 5-6) which may be used to affix the electric motor 200 to an interior portion of the motor compartment 112. The electric motor 200 is coupled to the motor mounting assembly 130 such that the axis of rotation 122 of the electric motor 200 is parallel to the transverse direction 124 of the electric vehicle 110 as noted above.

Figure 2:
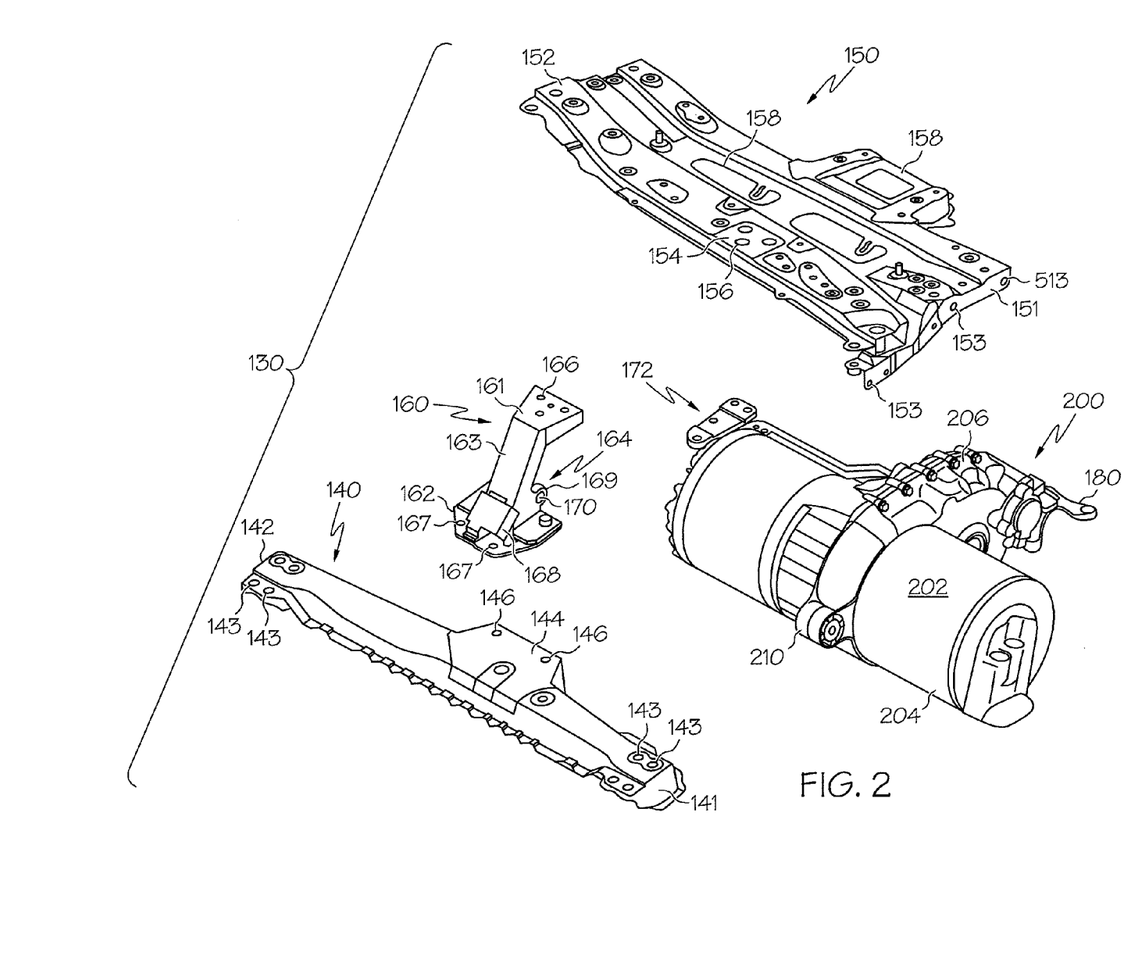
FIG. 2 schematically depicts an exploded view of the motor mounting assembly of FIG. 1.

Referring now to FIGS. 1A-1B and 2, the front cross member 140 is transversely oriented within the motor compartment 112. The front cross member 140 extends between a first end 141 and a second end 142. The first end 141 of the front cross member 140 mounts to the lower right side member 120 (FIG. 1B). The second end 142 of the front cross member 140 mounts to the lower left side member 116 (FIG. 1B). In the embodiments described herein, the front cross member 140 includes a plurality of apertures 143 located in the first end 141 and the second end 142. The apertures facilitate securing the front cross member 140 to the lower right side member 120 and the lower left side member 116 with threaded fasteners, such as bolts. However, it should be understood that the front cross member may be secured to the lower right side member 120 and the lower left side member 116 using other joining techniques, including, without limitation, welding.

The front cross member 140 further includes a mounting platform 144 located between the first end 141 and the second end 142. In the embodiment shown in FIG. 2, the mounting platform 144 is integrally formed with the front cross member 140, such as when the mounting platform 144 and the front cross member 140 are formed from a single piece of material. However, in other embodiments (not shown), the mounting platform 144 may be formed separately from the front cross member 140 and thereafter coupled to the front cross member 140 with by bolts, screws, rivets, welds or the like. In the embodiments described herein, the mounting platform 144 is adapted to support the lower plate 162 of the motor mount member 160. For example, in the embodiment depicted in FIG. 2, the mounting platform 144 includes a plurality of apertures 146 for receiving one or more bolts which secure the motor mount member 160 to the mounting platform 144. In some embodiments, the apertures 146 may be threaded while, in other embodiments, each of the apertures may further include a weld nut welded to the underside of the mounting platform 144 in order to facilitate securing the motor mount member 160 to the mounting platform 144 of the front cross member 140. To provide a greater surface area for supporting the motor mount member 160, the mounting platform 144 protrudes from the front cross member 140 in the forward-aft direction 126 of the electric vehicle 110.

In the embodiments described herein the front cross member 140 is formed from a metallic material such as, for example, galvanized steel. An exemplary steel material is SCGA 440 MPa galvanized or galvannealed steel. However, it should be understood that the cross members may be made from other metallic materials suitable for use in automotive structural applications. In the embodiments described herein, the front cross member 140 is formed by stamping the metallic material into the desired shaped. However, it should be understood that other forming techniques may be utilized to form the front cross member 140.

Still referring to FIGS. 1A-1B and 2, the motor compartment cross member 150 is transversely oriented within the motor compartment 112. The motor compartment cross member 150 is offset from the front cross member 140 in the vertical direction 128, as shown in FIGS. 1A-1B. In one or more embodiments, the motor compartment cross member 150 is also offset from the front cross member 140 in the forward-aft direction 126 of the electric vehicle 110. The motor compartment cross member 150 extends between a first end 151 and a second end 152. The first end 151 of the motor compartment cross member 150 mounts to the upper right side member 121 (FIG. 1B). The second end 152 of the motor compartment cross member 150 mounts to the upper left side member 117 (FIG. 1B). In the embodiments described herein, the motor compartment cross member 150 includes a plurality of apertures 153 located in the first end 151 and second end 152. The apertures facilitate securing the motor compartment cross member 150 to the upper right side member 121 and the upper left side member 117 with threaded fasteners, such as bolts. However, it should be understood that the motor compartment cross member 150 may be secured to the upper right side member 121 and the upper left side member 117 using other joining techniques, including, without limitation, welding. In an alternative embodiment of the motor compartment cross member 150, the first end 151 of the motor compartment cross member 150 is connected to the upper right side member 121 with a bracket.

It should be noted that, in some embodiments, the motor compartment cross member 150 is not planar. For example, as depicted in FIG. 2, the first end 151 of the motor compartment cross member 150 is out of plane with respect to the remainder of the motor compartment cross member 150.

The motor compartment cross member 150 further includes a mounting platform 154 located between the first end 151 and the second end 152. In the embodiment shown in FIG. 2, the mounting platform 154 is integrally formed with the motor compartment cross member 150, such as when the mounting platform 154 and the motor compartment cross member 150 are formed from a single piece of material. However, in other embodiments (not shown), the mounting platform 154 may be formed separately from the motor compartment cross member 150 and thereafter coupled to the motor compartment cross member 150 such as by bolts, screws, rivets, welds or the like. In the embodiment described herein, the mounting platform 154 is adapted to support the upper plate 161 of the motor mount member 160. For example, in the embodiment depicted in FIG. 2, the mounting platform 154 includes a plurality of apertures 156 for receiving one or more bolts which secure the motor mount member 160 to the mounting platform 154. In some embodiments, the apertures 156 may be threaded while, in other embodiments, each of the apertures 146 may further include a weld nut welded to the topside of the mounting platform 154 of the motor compartment cross member 150.

In the embodiments described herein, the motor compartment cross member 150 is made of a metallic material such as, for example, galvanized steel. An exemplary steel material is SCGA 440 MPa galvanized or galvannealed steel. However, it should be understood that the motor compartment cross member may be made from other metallic materials suitable for use in automotive structural applications. In the embodiments described herein, the motor compartment cross member 150 is formed by stamping the metallic material into the desired shaped. However, it should be understood that other forming techniques may be utilized to form the motor compartment cross member 150. In one embodiment, the motor compartment cross member 150 includes additional support structures 158 to support components mounted thereto. Such components may include drive system components and high voltage components.

Still referring to FIGS. 1A-1B and 2, the motor mount member 160 generally extends between the front cross member 140 and the motor compartment cross member 150 and is connected to both the front cross member 140 and the motor compartment cross member 150. The motor mount member 160 includes an upper plate 161 at a top portion thereof, a lower plate 162 at a bottom portion thereof, and a hanger 163 extending between the upper plate 161 and the lower plate 162.

In the embodiments described herein, the upper plate 161 is integrally formed with the hanger 163 such as when the upper plate 161 and hanger 163 are stamped from a single piece of material. In alternative embodiments (not shown) the upper plate 161 and the hanger 163 may be separately formed. For example, the upper plate 161 and the hanger 163 may be separately formed and joined together such as by welding or the like. In the embodiments of the motor mount member 160 described herein, the upper plate 161 is trapezoidal in shape and includes a plurality of apertures 166. The apertures 166 facilitate securing the upper plate 161 of the motor mount member 160 to the mounting platform 154 of the motor compartment cross member 150 with threaded fasteners, such as bolts. However, it should be understood that the motor mount member 160 may be secured to the motor compartment cross member 150 using other joining techniques, including, without limitation, welding.

Figures 4, 5:
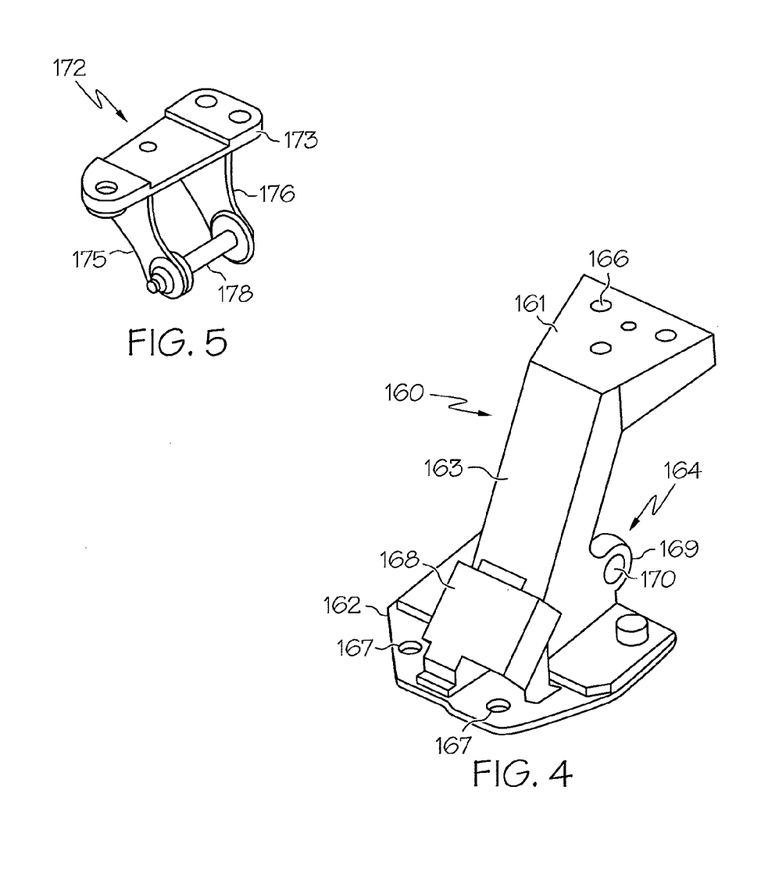
FIG. 4 schematically depicts the motor mount member of the motor mounting assembly of FIG. 2.
FIG. 5 schematically depicts an auxiliary side motor mount for use in conjunction with the motor mounting assembly.

In the embodiment of the motor mount member 160 depicted in FIGS. 2 and 4, the lower plate 162 and the hanger 163 are separate components which are joined together such as by welding or the like. However, in other embodiments, the lower plate 162 and the hanger 163 may be integrally formed, such as when the lower plate 162 and the hanger 163 are formed from a single piece of material in a stamping operation.

In the embodiment of the motor mount member 160 described herein, a gusset plate is coupled to the hanger and at least one of the top plate and the bottom plate. In the embodiment shown in FIGS. 2 and 4, the lower plate 162 and the hanger 163 are joined together with a gusset plate 168. The gusset plate 168 may be a sheet of steel that can be fastened to the lower plate 162 and the hanger 163 using bolts, rivets, welding, or combinations thereof. The gusset plate 168 may be made from either cold rolled or galvanized steel. The gusset plate 168 generally reinforces the joint between the lower plate 162 and the hanger 163 thereby improving the load carrying capability of the motor mount member 160.

In the embodiments of the motor mount member 160 described herein, the lower plate 162 includes a plurality of apertures 167. The apertures 167 facilitate securing the lower plate 162 of the motor mount member 160 to the mounting platform 144 of the front cross member 140 with threaded fasteners, such as bolts. However, it should be understood that the motor mount member 160 may be secured to the front cross member 140 using other joining techniques, including, without limitations, welding. For example, in one embodiment, the lower plate 162 is attached with one or more bolts, such as when the mounting platform 144 of the front cross member 140 includes one or more weld nuts for threadably receiving the one or more bolts. In an alternative embodiment (not shown), the lower plate 162 may be welded to the mounting platform 144.

As seen in FIGS. 2 and 4, the hanger 163 of the motor mount member 160 is angled such that the upper plate 161 is horizontally offset from the lower plate 162. The angled orientation of the hanger 163 allows the motor compartment cross member 150 to be both offset from the front cross member 140 in both the vertical direction 128 and in the forward-aft direction 126 of the electric vehicle 110.

In the embodiments described herein, the hanger 163 of the motor mount member 160 includes an integrated attachment point 164 extending therefrom. When the motor mounting assembly 130 is positioned in the motor compartment 112, the attachment point 164 extends toward the rear of the vehicle 110. In one embodiment, the attachment point 164 is a clevis fastener which includes a U-shaped extension 169. Each prong of the U-shaped extension 169 includes a circular opening 170 for receiving a mounting bolt 165. The attachment point 164 is generally oriented such that, when the mounting bolt 165 is positioned in the attachment point 164, the long axis of the mounting bolt 165 is oriented in the transverse direction 124.

In the embodiments described herein, the motor mount member 160 is formed from a metallic material such as, for example, galvanized steel. An exemplary steel material is SCGA 440 MPa galvanized or galvannealed steel. However, it should be understood that the motor mount member 160 may be made from other metallic materials suitable for use in automotive structural applications. In the embodiments described herein, the motor mount member 160 is formed by stamping the metallic material into the desired shape of the various components of the motor mount member 160 (i.e., the lower plate 162, gusset plate 168, and hanger 163) and then welding the various components together. However, it should be understood that other forming techniques may be utilized to form the motor mount member 160.

Figure 3:
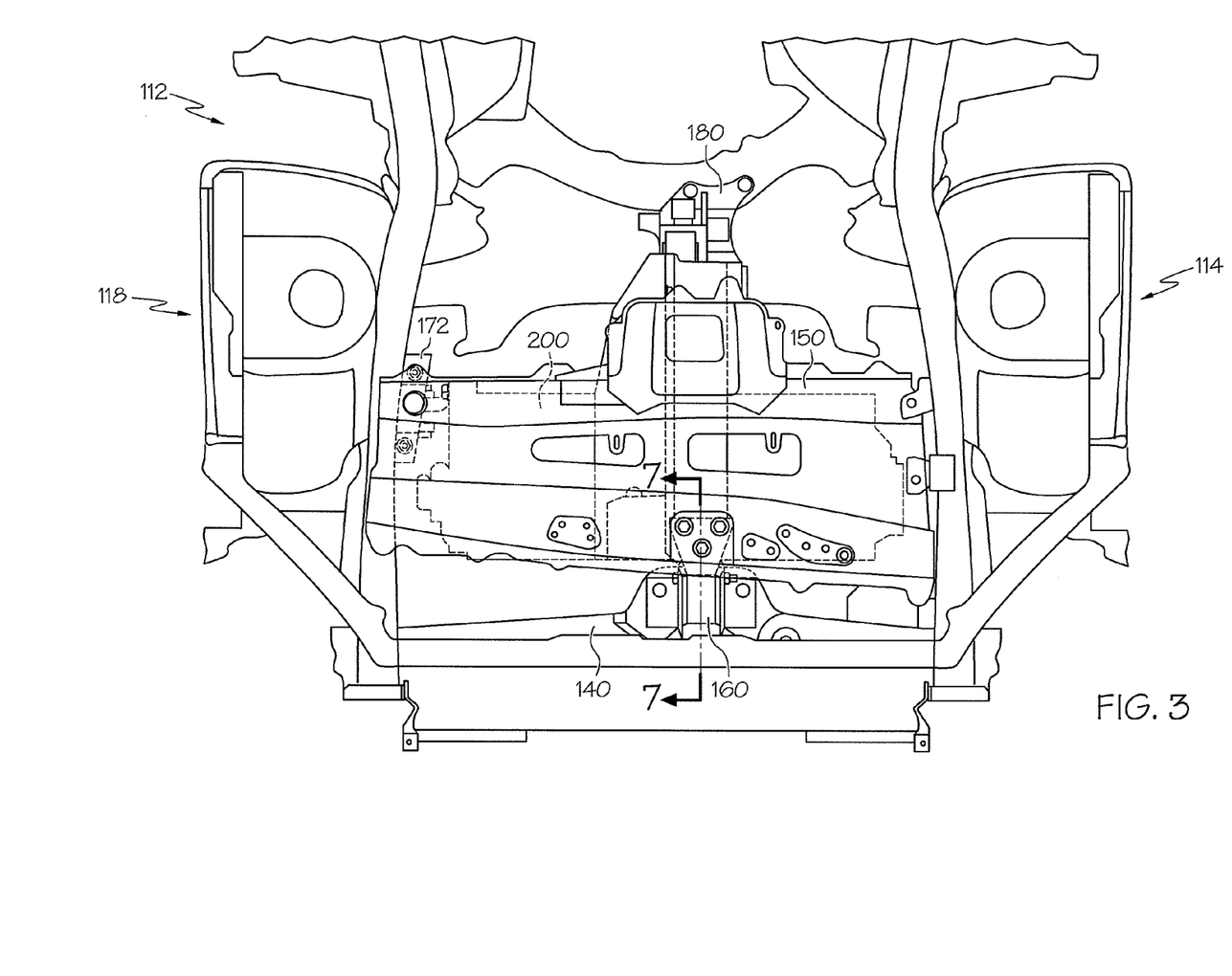
FIG. 3 schematically depicts a top view of the motor compartment of FIG. 1A and FIG. 1B.

FIG. 3 is a top view of the motor compartment 112. FIG. 3 shows the front cross member 140 oriented transverse to the motor compartment 112. The motor mount member 160 is shown extending from the front cross member 140. Although not shown in this figure, the motor compartment cross member 150 is attached to the upper plate 161 of the motor mount member 160. The electric motor 200 is adjacent the motor mount member 160, and although not shown in FIG. 3, the electric motor 200 is attached to the motor mount member 160 at the attachment point of the hanger 163. The electric motor 200 is positioned in the center of the motor compartment 112.

Figure 7:
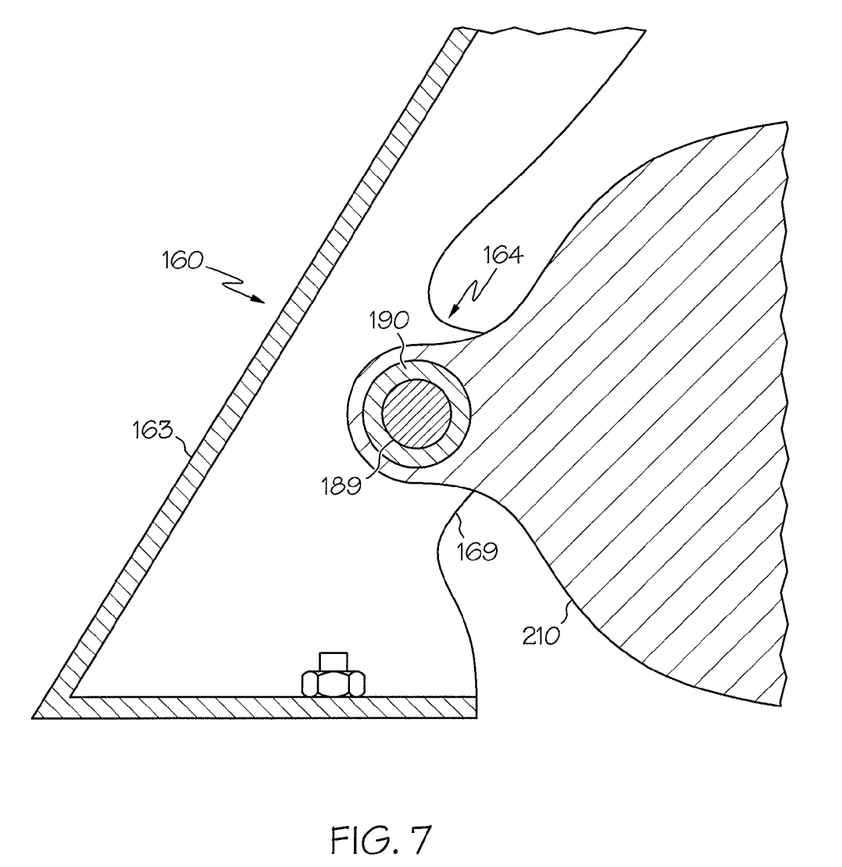
FIG. 7 is a partial cross-section of the motor mounting assembly of FIG. 3.

Referring now to FIGS. 2 and 7, FIG. 7 schematically depicts a partial cross-section of the motor mount member 160 and electric motor 200 showing the electric motor 200 mounted to the attachment point 164 of the motor mount member 160. The mounting bolt 165 passes through the circular openings 170 of the U-shaped extension 169 of the attachment point 164. The mounting bolt 165 also passes through a mounting point 210 coupled to the casing of the electric motor 200. The front mounting bolt 165 is secured in place such as with a nut and/or retaining pin to attach the electric motor 200 to the motor mount member 160.

FIG. 7 also includes a cross sectional view of an isolation member 190. The isolation member 190 is positioned around the mounting bolt 165. The isolation member 190 is made of vibration damping material, such as rubber or the like, which is inserted through the circular openings 170 in the U-shaped extension 169 and the mounting point 210. The isolation member 190 fills the space between the mounting bolt 165, the circular openings 170 and the mounting point 210 of the electric motor 200 to prevent unwanted vibration and/or movement of the electric motor 200.

Referring now to FIGS. 2 and 4-6, the electric motor 200 may generally include a housing 202 which encloses an inverter 204. Additionally, the electric motor 200 may also include a transmission 206 which couples the armature of the electric motor to the drive train of the electric vehicle 110. These components of the electric motor 200 increase the weight of the electric motor and, more importantly, cause the electric motor to be unbalanced. The effects of this imbalance are exacerbated by the transverse orientation of the motor with respect to the vehicle and the high torque generated by the motor during operation. Accordingly, in some embodiments, the electric vehicle may further include auxiliary motor mounts 172, 180 which may be utilized in conjunction with the motor mounting assembly to further stabilize the electric motor in the motor compartment 112 of the electric vehicle, as noted above. As shown in FIG. 2, the auxiliary motor mounts 172, 180 may attach the electric motor 200 to one or more of the sides of the engine compartment and to structural components positioned aft of the electric motor 200, such as, for example, the front suspension member of the vehicle.

FIG. 5 schematically depicts the right side auxiliary motor mount 172. The right side auxiliary motor mount 172 includes an upper plate 173 which is generally oriented in the forward-aft direction 126 when the right side auxiliary motor mount 172 is installed in the engine compartment of the electric vehicle. In one embodiment, the upper plate 173 is mounted to the underside of the upper right side member 121 with a plurality of bolts. However, it should be understood that the upper plate 173 may be mounted at other locations on the frame of the electric vehicle 110 in order to secure the electric motor 200 to the vehicle. Further, it should be understood that the upper plate 173 may be attached using other joining techniques, such as welding. The right side auxiliary motor mount 172 further includes a first finger 175 and a second finger 176 integrally formed with the upper plate 173. The first finger 175 and the second finger 176 generally extend downward in the vertical direction 128 from the bottom of the upper plate 173. The first finger 175 and the second finger 176 each include a circular opening 177 at the distal end of each finger 175,176. The first finger 175 and the second finger 176 are separated from each other in the forward-aft direction 126. A mounting bolt 178 and, optionally, an isolation member such as a grommet formed from a vibration damping material, may be positioned in the circular openings 177 of both the first finger 175 and the second finger 176 to facilitate attaching the electric motor 200 to the right side auxiliary motor mount 172. The mounting bolt 178 extends through a portion of the electric motor 200 to securely mount the electric motor 200 to the right side auxiliary motor mount 172. While the side auxiliary motor mount 172 has been described herein as a "right side" auxiliary motor mount 172, it should be understood that, a similar motor mount structure may be used, alternatively or additionally, on the left side of the electric motor.

Figure 6:
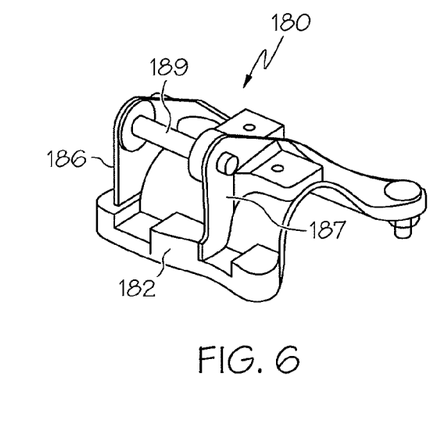
FIG. 6 schematically depicts an auxiliary rear motor mount for use in conjunction with the motor mounting assembly.

Referring now to FIG. 6, the rear auxiliary motor mount 180 includes a base 182 oriented in the transverse direction 124 when the rear auxiliary motor mount is installed in the motor compartment of the vehicle. The base 182 is mounted to structural components of the vehicle 110 aft of the electric motor 200, such as the front suspension member. However, it should be understood that the base 182 may be mounted to other components in the engine compartment of the electric vehicle 110 in order to secure the electric motor 200 to the vehicle 110. Further, it should be understood that the base 182 may be attached using other joining techniques, such as welding. The rear auxiliary motor mount 180 further includes a first support flange 186 and a second support flange 187 integrally formed with the base 182. The first support flange 186 and the second support flange 187 are generally parallel with one another and extend from the top of the base 182. The first support flange 186 and the second support flange 187 each include a circular opening 188 at a distal end of each support flange 186,187. A mounting bolt 189 and, optionally, an isolation member such as a grommet formed from a vibration damping material, may be positioned in the circular openings 188 of both the first support flange 186 and the second support flange 187 to facilitate attaching the electric motor 200 to the rear auxiliary motor mount 180. The mounting bolt 189 extends through a portion of the electric motor 200 to securely mount the electric motor 200 to the rear auxiliary motor mount 180.

The side auxiliary motor mount 172 and the rear auxiliary motor mount 180 are may be initially attached to the electric motor (as shown in FIG. 2) and affixed to the vehicle during installation of the electric motor into the vehicle. Alternatively, the side auxiliary motor mount 172 and the rear auxiliary motor mount 180 may be attached to the vehicle and, thereafter, secured to the electric motor as the electric motor is installed in the motor compartment of the vehicle.

Referring again to FIGS. 1A-1B and 2, in one embodiment, the front cross member 140, motor mount member 160 and the electric motor 200 may be assembled prior to installation in the motor compartment to form an electric vehicle drive train sub-assembly. In the sub-assembly, the lower plate 162 of the motor mount member 160 is attached to the mounting platform 144 of the front cross member 140 and the electric motor 200 is secured to the attachment point 164 on the hanger 163 of the motor mount member 160. When installed on the electric motor 200, a long axis of the front cross member is substantially parallel with an axis of rotation of the electric motor. The sub-assembly may be installed into the motor compartment 112 of the electric vehicle 110 through the bottom of the motor compartment 112. Once properly positioned within the motor compartment 112, the sub-assembly is attached to the frame of the electric vehicle 110. More specifically, the upper plate 161 of the motor mount member 160 is attached to the mounting platform 154 of the motor compartment cross member 150, the front cross member 140 is secured to the lower right side member 120 and lower left side member 116, and the electric motor 200 is attached to the right side auxiliary motor mount 172 and the rear auxiliary motor mount 180.

It should now be understood that the motor mounting assemblies described herein may be utilized to support a transversely oriented electric motor in the motor compartment of a vehicle. The motor mounting assemblies described herein provide greater support to the electric motor and counter the torque developed by the electric motor. Specifically the extra torque generated by electric motor is transferred to the motor mount member and, because the motor mount member is attached at both the top and bottom to the motor compartment cross member and the front cross member which, in turn, are attached to the side members of the vehicle, the loads carried by the motor mount member are more equally distributed throughout the frame of the vehicle.

In particular, the transverse orientation of the motor compartment cross member and the front cross member forward of the electric motor facilitate positioning a mounting point for the electric motor forward of the motor where, in conventional vehicle configurations, there are no transverse structural support members with sufficient strength to carry the load and counteract the torque of the electric motor. More specifically, utilizing a motor compartment cross member and a front cross member which transversely span the motor compartment facilitates connecting the motor mount member between the motor compartment cross member and the front cross member such that the attachment point of the motor mount member is positioned in the motor compartment forward of the electric motor.

Further, auxiliary motor mounts may be utilized in conjunction with the motor mounting assemblies to provide additional support and stability to the electric motor. Specifically, the auxiliary motor mounts may be utilized at the transverse ends of the motor and/or aft of the motor to further support the electric motor and to counteract the torque exerted by the electric motor on the motor mounting assemblies.

It should also be understood that the motor mounting assemblies described herein may be utilized to retrofit vehicles designed for conventional internal combustion engines with electric motors.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. An electric vehicle comprising:
   a right side member and a left side member with a motor compartment disposed therebetween;
   a motor compartment cross member extending transversely across the motor compartment, wherein the motor compartment cross member is coupled to the left side member and the right side member;
   a front cross member extending transversely across the motor compartment, wherein the front cross member is coupled to the left side member and the right side member and spaced apart from the motor compartment cross member in a vertical direction; and
   a motor mount member extending between the front cross member and the motor compartment cross member in a forward-aft direction of the electric vehicle, wherein the motor mount member is coupled to the front cross member and the motor compartment cross member, the motor mount member comprising an attachment point for receiving a corresponding mounting point of an electric motor.

2. The electric vehicle of claim 1, wherein the motor mount member comprises a top plate, a bottom plate and a hanger, wherein:
   the top plate is coupled to the motor compartment cross member;
   the bottom plate is coupled to the front cross member; and
   the hanger is coupled to the top plate and the bottom plate and the attachment point is positioned on the hanger.

3. The electric vehicle of claim 2, wherein the motor mount member further comprises a gusset plate coupled to the hanger and at least one of the top plate and the bottom plate.

4. The electric vehicle of claim 1, wherein the attachment point is a clevis.

5. The electric vehicle of claim 1, wherein the motor compartment cross member and the front cross member are spaced apart in the forward-aft direction of the electric vehicle.

6. The electric vehicle of claim 1, further comprising an electric motor coupled to the attachment point of the motor mount member.

7. The electric vehicle of claim 6, further comprising an isolation member disposed between the attachment point and the electric motor.

8. The electric vehicle of claim 1, further comprising a side auxiliary motor mount, wherein the side auxiliary motor mount couples the electric motor to at least one of the right side member and the left side member.

9. The electric vehicle of claim 1, further comprising a rear auxiliary motor mount, wherein the rear auxiliary motor mount couples the electric motor to a structural component of the electric vehicle aft of the electric motor.

10. The electric vehicle of claim 1, wherein the motor compartment cross member is attached to at least one of the right side member and the left side member with a bracket.

11. An electric vehicle drive train subassembly comprising:
an electric motor;
a front cross member extending between a first end and a second end of the front cross member, wherein a long axis of the front cross member is substantially parallel with an axis of rotation of the electric motor; and
a motor mount member comprising a hanger coupled to and extending between a top plate and a bottom plate that is offset in a vertical direction from the top plate, wherein:
the bottom plate is coupled to the front cross member,
the hanger comprises an attachment point, and
the electric motor is coupled to the attachment point.

12. The electric vehicle drive train subassembly of claim 11, wherein the attachment point is a clevis.

13. The electric vehicle drive train subassembly of claim 11, wherein the motor mount member further comprises a gusset plate coupled to the hanger and at least one of the top plate and the bottom plate.

14. The electric vehicle drive train subassembly of claim 11, further comprising an isolation member disposed between the attachment point and the electric motor.

15. The electric vehicle drive train subassembly of claim 11, further comprising a side auxiliary motor mount attached to a casing of the electric motor.

16. The electric vehicle drive train subassembly of claim 11, further comprising a rear auxiliary motor mount, attached to a casing of the electric motor.

17. The electric vehicle drive train subassembly of claim 11, wherein the attachment point of the hangar is positioned in the vertical direction between the top plate and the bottom plate.

18. A method of assembling an electric vehicle drive train subassembly into a vehicle subassembly comprising:
positioning an electric motor drive train subassembly below a vehicle body, the electric motor drive train subassembly comprising:
an electric motor;
a front cross member extending between a first end and a second end of the front cross member, wherein a long axis of the front cross member is substantially parallel with an axis of rotation of the electric motor; and
a motor mount member comprising a hanger coupled to a top plate and a bottom plate;
wherein the bottom plate is coupled to the front cross member; the hanger comprises an attachment point; and the electric motor is coupled to the attachment point;
mating the electric motor drive train subassembly with an electric motor opening of the vehicle body;
securing the front cross member to a left side member and a right side member of the vehicle body such that the front cross member extends transversely across the electric motor opening of the vehicle body; and
securing the motor mount member to a motor compartment cross member extending transversely across the electric motor opening of the vehicle body.

* * * * *